March 27, 1951     E. L. LAUNDER ET AL     2,546,457
FASTENER FOR A TOOTH CAP OR THE LIKE
Filed Aug. 21, 1946
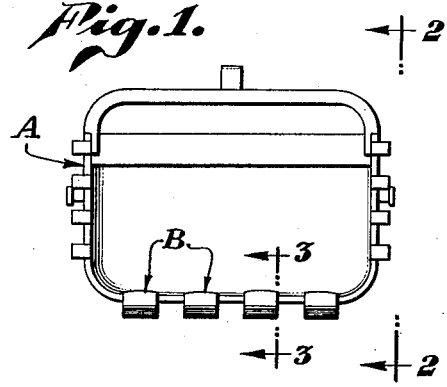
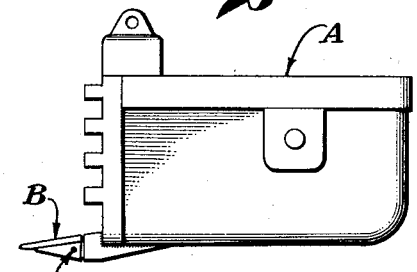
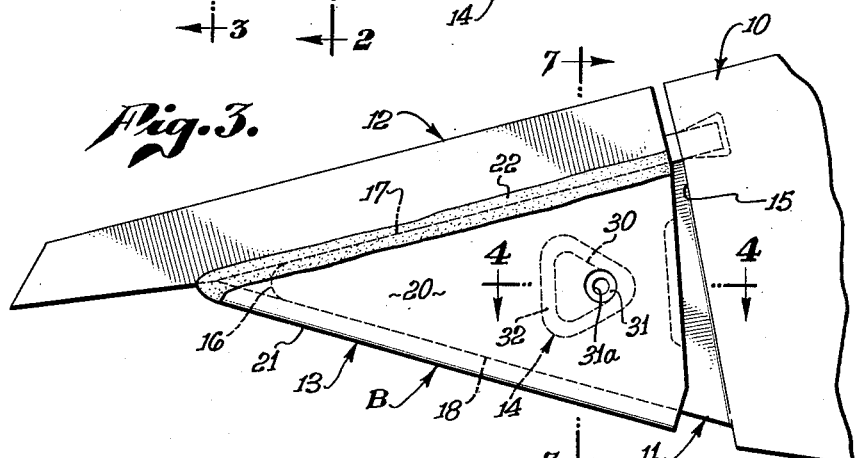
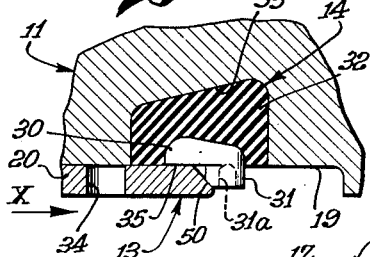
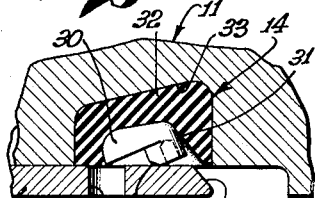
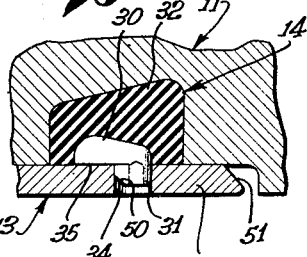
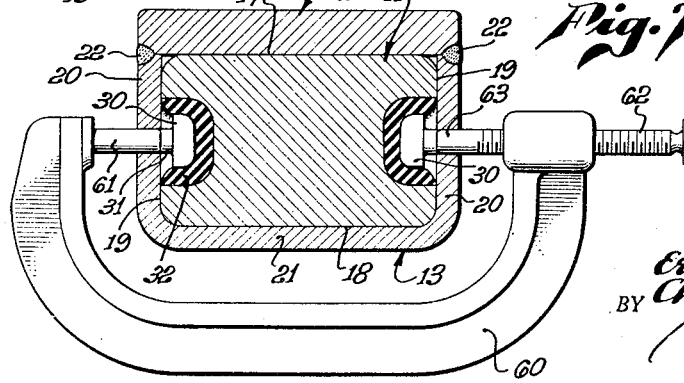
INVENTOR.
Ernie L. Launder
Chester C. Hosmer
BY
ATTORNEY

Patented Mar. 27, 1951

2,546,457

UNITED STATES PATENT OFFICE 2,546,457

FASTENER FOR A TOOTH CAP OR THE LIKE

Ernie L. Launder, Montebello, and Chester C. Hosmer, Long Beach, Calif.

Application August 21, 1946, Serial No. 691,975

2 Claims. (Cl. 37—142)

This invention has to do with a fastener for a tooth cap, or the like, and is primarily concerned with a construction whereby the cap of a digger tooth, or the like, is releasably held or fastened to a part such as a tooth in a manner so that it can, when desired, be removed. It is a general object of the invention to provide a fastener or structure of the character mentioned which is simple, effective and dependable.

The present invention provides a fastener unit that can be used to advantage in various situations. However, since it is particularly useful in a digger tooth, or the like, we have disclosed it in such connection, it being understood that we do not wish the broader principles of the invention limited or considered restricted by this particular reference.

It is a general object of the present invention to provide a fastener unit of the general character referred to which involves few simple parts which are inexpensive of manufacture and which can be handled or operated easily and conveniently.

It is another object of the present invention to provide a structure such for example as a capped digger tooth construction wherein the cap is removable from the tooth proper and is normally releasably retained on the tooth by means of a pair of oppositely disposed fastener units of the character above mentioned.

It is another object of the present invention to provide a construction of the general character referred to which includes fastener units such as we have mentioned combined with a tooth and cap therefor so that the cap can be readily applied to the tooth but can only be removed therefrom by means of simultaneous application of pressure in opposite directions applied at the sides of the structure. Through the construction an arrangement that we have provided danger of accidental failure or dislodgment of the cap from the tooth is minimized, as it is practically impossible for the operation necessary to dislodge the cap to occur except when deliberately performed.

The various objects and features of our invention will be fully understood from the following detailed description of a typical preferred form and application of the invention, throughout which description reference is made to the accompanying drawings, in which:

Fig. 1 is a front elevation of a bucket embodying digger teeth having caps retained in accordance with the present invention. Fig. 2 is a side elevation of the bucket being a view taken as indicated by line 2—2 on Fig. 1. Fig. 3 is an enlarged side elevation of a digger tooth being a view taken as indicated by line 3—3 on Fig. 1. Fig. 4 is an enlarged detailed sectional view taken at one of the fastener units and in the direction indicated by arrow 4—4 on Fig. 3, showing the cap positioned for application to the tooth and in engagement with the fastening device ready to depress it. Fig. 5 is a view similar to Fig. 4 showing the cap partially applied to the tooth in which position the fastening device is depressed. Fig. 6 is a view similar to Fig. 4 showing the cap fully applied with the fastening device engaged or in operating position, and Fig. 7 is a reduced transverse sectional view taken as indicated by line 7—7 on Fig. 3, showing the manner in which pressure can be applied to the fastening devices to release them.

In the drawings we illustrate a bucket A having a plurality of digger teeth B each of which involves a removable or detachable cap or tooth point, which cap is retained on the tooth by the construction that we have provided. The particular structure illustrated involves an adapter or base 10 which is a part of the bucket proper, and each nose piece or tooth B has a tooth projection 11 projecting from the base and carrying a tooth point or cap which includes a body 12 and a housing 13 which parts are connected or joined to form a unit which fits over or encases the tooth 11. The present invention provides one or more fastener units 14 which serve to releasably retain the cap on the tooth. In the preferred construction we employ two fastener units 14 and locate them at opposite sides of the tooth construction so that they operate in opposite directions for reasons which will be hereinafter apparent.

The base 10 which is at the forward portion or lip of the bucket A has a forward end face 15 and the tooth projection 11 projects forward from the face 15. In practice the tooth 11 is preferably formed as an integral or continuous part of the base 10 and it is tapered forward to terminate at a point 16. In the particular case illustrated the top 17 of the tooth 11 is flat and the bottom 18 of the tooth is also flat and these parts converge from the front face 15 of the base 10 to the point or tip 16 of the tooth. The sides 19 of the tooth are parallel and flat and in the preferred construction the tooth is of uniform width throughout its length. The thickness of the tooth varies by reason of the angular relationship between the top and bottom 17 and 18, respectively.

The body 12 of the tooth cap is a flat plate-like part or spike which bears on the top 17 of the tooth and projects forward from the tip 16 of the tooth to form a digging or cutting part. In practice the body 12 is a heavy sturdy element and its forward or projecting end portion is dressed and finished to be wear resisting and to have the desired action.

The housing 13 of the cap includes sides 20 which depend from the edge portions of the body 12 adjacent the sides 19 of the tooth and it has a bottom 21 which extends between the lower edge portions of the sides 20 and which seats against the bottom 18 of the tooth. The housing 13 may be formed of a plate or sheet of stock somewhat lighter than the body 12 and may, as shown in the drawings, be formed from a single sheet or body of material joined to the body 12, as by welding 22.

Each fastening unit 14 of the present invention includes, generally, a fastener body 30 carrying a dog or head 31 and a mounting for the body including a pad 32 of resilient material carried in a socket 33 in one of the parts to be connected. In the case illustrated the tooth projection 11 affords a part in which the socket 33 can be formed advantageously and, therefore, we have shown an arrangement wherein the fastener parts above referred to are applied to the tooth projection by the mounting of the pad 32 in a socket formed in the tooth. The dog or head 31 of the fastener engages or extends into an opening 34 in the other parts to be fastened, for instance, in the cap which fits over the tooth, which opening 34 is located to register with the dog or head 31 when the parts are fully engaged or fitted together, as illustrated in Figs. 1, 2, 3 and 6 of the drawings. In the preferred arrangement the socket 33 is in a side 19 of the tooth projection while the opening 34 is located in a side 20 of the housing 13 of the tooth cap.

The body 30 of the fastener is a block from which the dog or head 31 projects and in practice it may vary widely in size and shape. In the form of the invention illustrated the body is shown as a triangular block arranged with one side faced toward the tip or point 16 of the tooth while the dog or head 31 projects from the outer side of the body at the corner portion where the other two sides thereof meet, this being at the corner of the body which faces or points toward the face 15 of the base from which the tooth 11 projects. The pad 32 of resilient material is preferably a pad of rubber-like material forming a cushion beneath the body 30 and preferably supporting the body so that its outer side 35 is normally flush with the side 19 of the tooth projection 11.

The socket 33 in the tooth 11 is made to suitably carry or accommodate the pad 32 and like the pad it may vary widely in size and shape. In the particular case illustrated where the body 30 is generally triangular in shape, as shown in Fig. 3, it is desirable that the mouth of the socket be triangular in shape and where the dog 31 projects from the body 30 at the corner toward the inner end of the tooth it is preferred that the socket be formed to be of maximum depth beneath that end portion of the body 30. In the case illustrated the socket 33 is shown with a flat bottom pitched so that the socket is considerably deeper toward the inner end of the tooth than it is toward the outer end, thus affording a maximum pad or body of resilient material beneath the portion of the body 30 which supports the dog.

In practice I provide a resilient pad or body of rubber or rubber-like material 32 which normally yieldingly supports the body 30 in the position shown in Figs. 4 and 6 of the drawings yet allows it to be forced in or depressed to a position such as is shown in Figs. 5 and 7 of the drawings. It is to be understood that the shape and proportioning of the pad and the socket which carries it will in practice vary widely, depending upon the particular material used in the formation of the pad.

The dog or head 31 that projects from the body 30 is preferably formed integral with the body and is a pin-like projection, for instance, it is preferably round in cross sectional configuration and it may have its corner 50 toward the outer end of the tooth dressed or beveled to facilitate cooperation with a beveled face 51 provided on the innermost edge of the side 20 of the tooth cap. The manner in which the dog and beveled edge 51 cooperate or engage is shown in Fig. 4 from which it will be apparent that these parts are so related that as the cap is moved onto the tooth in the direction indicated by the arrow X in Fig. 4 the dog 31 with its supporting body is deflected or depressed to a position shown in Fig. 5 allowing the side of the tooth cap to pass inward to a position where the opening 34 therein approaches register with the dog. It is preferred to proportion the parts so that the dog does not fall into the opening but must be forced or pried to bring it into alignment with the opening. This leaves the structure under pressure or strain. Sockets 31$^a$ may be provided in the outer ends of the dogs to receive a tool suitable for prying the dogs into position. As soon as the opening 34 registers with the dog 31 the resilience of the pad 32 beneath the body supporting the dog causes the dog to move out and assume full operating position in the opening 34 as shown in Fig. 6 of the drawings.

In accordance with the preferred form of the invention there are two fastener units 14 such as have been described and these are located in opposite sides 19 of the tooth 11 so that the dogs 31 thereof bear or face outwardly and consequently in opposite directions. In practice it is desirable to locate the fastening units so that they are directly opposite each other as shown in the drawings. With this arrangement of parts it is simple and easy to apply depressing forces to the dogs 31 or in other words to press them inwardly in opposite directions and simultaneously so that they simultaneously release the cap allowing it to move off of the tooth. In Fig. 7 of the drawings we illustrate a manner in which this can be done by means of a simple C-clamp wherein the C-shaped body 60 of the clamp is provided on one leg with a pin 61 to enter one of the openings 34 and engage one of the dogs 31 while a screw 62 carries a pin 63 which enters the other opening 34 and engages the other pin projection. As the screw is tightened the pin projection 61 and 63 move in through the openings 34 pressing the dogs 31 inwardly until they are in a fully depressed position, as shown in Fig. 7, whereupon the force applied to withdraw the cap from the tooth will cause it to slide forward and become disengaged from the tooth.

It will be apparent from the foregoing description that through the construction that we have provided there are no cavities formed to be rendered inoperative by deposit of mud or debris and, furthermore, it is obvious that the parts are simple and inexpensive of manufacture and easy to operate. We prefer to anchor or imbed the body 30 of each fastener in its cushion or pad 32 so that it does not become dislodged therefrom and, in turn, the cushion or pad is made fast in its socket 33. Where rubber or rubber-like material is employed these fastenings or connections may be made by adhesives or by vulcanizing. It will be apparent also that in some cases the parts may be made to fit so that they are snug or fit tight together and require no special fastening means in order to remain in proper operating position, since there is little tendency for them to become dislodged when once arranged in place.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. In an excavating tooth, a shank with a cavity in a face thereof and a cap engaged over the shank and overlying said face, there being an opening in the cap registering with said cavity, a fastener confined to the cavity for projection into said opening to connect said shank and cap and including, a rigid body carried in the cavity and having a face flush with said face of the shank, a dog rigid on the face of the rigid body and projecting into the opening, and a resilient pad beneath the body and forming the sole support therefor, the body and pad completely occupying the cavity.

2. In an excavating tooth, a shank with opposite flat side faces, a cap engaged over the shank and having spaced flat side parts engaged over the said opposite flat side faces of the shank, there being cavities in the shank confined to said flat side faces and openings in the side parts of the cap registering with the said cavities, and means releasably connecting the elements including, two fastening units connecting said shank and cap at the two side parts and requiring simultaneous operation to release the cap from the shank for removal therefrom, each fastening unit including a body confined to one of the cavities and a dog projecting from the body into the opening registering with such cavity, and a resilient pad in the socket beneath the body and fully occupying the portion of the cavity not occupied by the body.

ERNIE L. LAUNDER.
CHESTER C. HOSMER.

REFERENCES CITED

The following references are of record in the file of this patent:

UNITED STATES PATENTS

| Number | Name | Date |
|---|---|---|
| 757,206 | Kovacs | Apr. 12, 1904 |
| 1,003,663 | Shelton | Sept. 19, 1911 |
| 1,807,998 | McCord | June 2, 1931 |
| 2,379,472 | Bowman | July 3, 1945 |
| 2,427,651 | Baer | Sept. 23, 1947 |

FOREIGN PATENTS

| Number | Country | Date |
|---|---|---|
| 449,511 | Germany | Sept. 20, 1927 |